L. S. FITHIAN.
Rotary-Cultivator.

No. 47,005. Patented Mar. 28, 1865.

Witnesses:

Inventor:

UNITED STATES PATENT OFFICE.

LEMUEL S. FITHIAN, OF RAHWAY, NEW JERSEY.

IMPROVEMENT IN TRACTION-WHEELS FOR ROTARY PLOWS.

Specification forming part of Letters Patent No. 47,005, dated March 28, 1865.

*To all whom it may concern:*

Be it known that I, LEMUEL S. FITHIAN, of the city of Rahway, county of Union, and State of New Jersey, have invented a new and Improved Traction-Wheel; and I do hereby declare that the following is a full, clear, and exact description thereof, reference being had to the accompanying drawings, making a part of this specification, in which—

Figure 1:
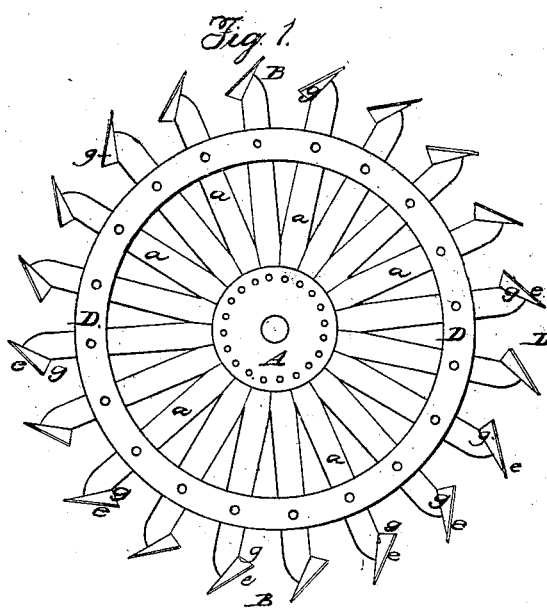
Figure 2:
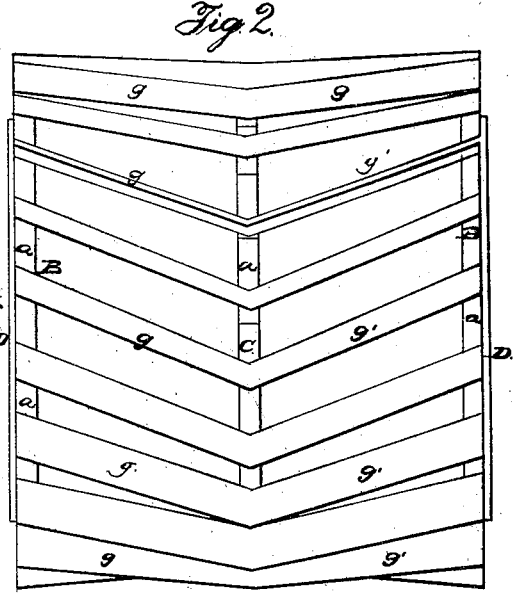
Figure 3:
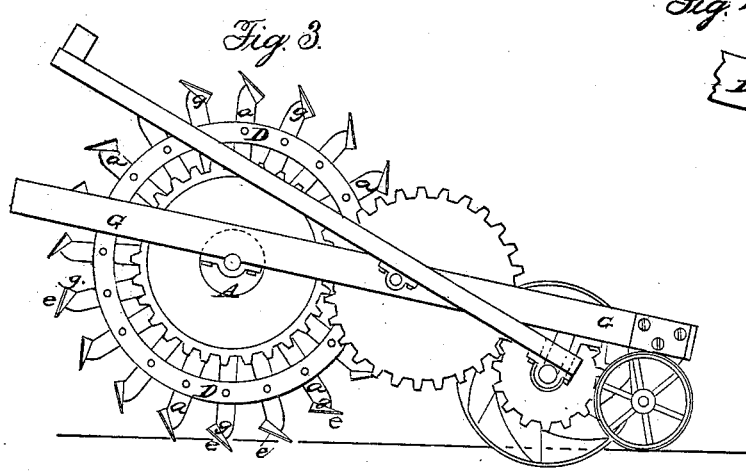
Figure 4:
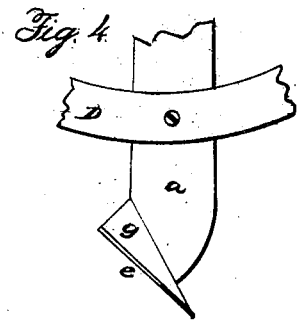

Figure 1 is an end view of the improved traction-wheel. Fig. 2 is a plan view thereof. Fig. 3 shows the wheel applied for driving or propelling a rotary plow. Fig. 4 is an end view of one of the beveled flanges in a position for acting upon the ground.

Similar letters of reference indicate corresponding parts in the several figures.

This invention relates to a novel mode of constructing the propelling or traction wheel of that class of machines commonly termed "steam-plows" or "ground motors," and which depend for their propulsion upon the traction or adhesion of their transporting-wheels upon the surface of the ground over which they move. Such wheels have hitherto been made very large and cumbrous and provided with slats, spikes, and other projections arranged upon their surfaces to prevent them from slipping or turning without moving their carriage; but all such contrivances work imperfectly upon arable or marshy land on account of the earth giving way under the resistance to be overcome.

The object of my invention is to increase the tractive or adhesive power of a wheel for propelling carriages without materially augmenting its weight, and at the same time to prevent the circumference of the wheel from sinking so deeply into the ground as to diminish its propelling force, as will be hereinafter described.

To enable others skilled in the art to understand my invention, I will describe its construction and operation.

In the accompanying drawings, A represents the flanged hub of one of the wheels B C D, and *a* are the radial spokes, which are secured rigidly into the hub A in any suitable manner.

D represents a ring, which is secured by bolts or other fastenings to each one of the spokes and to the sides of these spokes, as shown in Figs. 1 and 3. This ring serves to strengthen and to keep the spokes at a uniform distance apart. It resists the tangential strain upon the ends of the spokes during the movement of the machine over the ground and braces the entire wheel.

The spokes *a* are all of a uniform length, and their outer ends are beveled or rounded, as shown in the drawings, Figs. 1 and 3. If desirable, the ends of these spokes may be shod with metal and the spokes braced and tied together by employing more than one concentric ring arranged on one or both sides of the wheel. I employ in the construction of my propeller at least three of such wheels as I have just described, one of which will be arranged at each end and one, C, in the middle, as shown in Fig. 2. They constitute a frame-work for carrying slats or beveled bars $g\ g\ g'\ g'$, which form collectively the tread of the propeller and which come in contact with the surface traveled over. These slats or bars are in cross-section in the form of an acute-angle triangle, as shown in Figs. 1 and 4, and are secured to the ends of the spokes *a* in such manner that their outer surfaces are in planes tangential to a circle described within the circumference of the wheels, as shown in Fig. 1. These beveled slats $g\ g\ g'$ extend obliquely across from the spokes of one wheel to the spokes of that which is lettered C, and form obtuse angles, as represented in Fig. 2.

The slats may be curved instead of being angular, as shown; but in either case they will be sustained at or near the middle of their length by an intermediate wheel, C, whose spokes should be equal in length to those of the outer wheels, B B. If more than three wheels be employed, the slats may be extended across them in zigzag lines—that is to say, they may run obliquely from one wheel to another, substantially as shown in Fig. 2. By thus arranging the slats they present the greatest amount of resisting-surface to the ground in a given space and pack the earth in front of them in such manner that it will not be liable to crumble and give way. The position of the slats upon their spokes causes them to press downward and backward, and they have no tendency to lift the earth and carry it up with them as they move round.

In practice it will be found desirable to face the treading-surfaces of said slats with metal, which, if steel, can be sharpened on those edges which come in contact with the surface of the ground first as the wheel rolls over it. Such strips of metal are represented at *e e*, Figs. 1, 3, and 4. They may be bolted on the slats so that their cutting-edges will project from the slats, as shown, and serve to sever cornstalks or other substances in the path of the machine.

Fig. 3 represents the propelling-drum which I have just described applied to a carriage, G, carrying a rotary plow, which is driven by means of gearing communicating with a large driving spur-wheel which is keyed to the shaft of the propeller. The engine which turns the propeller is not represented in the drawings; but it may be connected to it in any convenient manner.

The outer edges of the slats may be curved to conform to the outer circumference of the propeller, so that it will move easily on hard ground.

Having thus described my invention, what I claim as new, and desire to secure by Letters Patent, is—

1. A traction-wheel or drum which is provided with beveled slats or bars extending obliquely across it, and operating substantially as described.

2. Securing the slats of a ground-propeller to the radial spokes of three or more wheels, which are constructed and braced substantially as described.

3. The employment of metal face-plates *e e*, in combination with the beveled and obliquely-arranged slats *g*, substantially as described.

LEMUEL S. FITHIAN.

Witnesses:
PATRICK CLARK,
W. F. JONAS.